(12) United States Patent
Williams et al.

(10) Patent No.: US 7,176,906 B2
(45) Date of Patent: Feb. 13, 2007

(54) METHOD OF GENERATING DIGITAL INK THICKNESS INFORMATION

(75) Inventors: Lyndsay Williams, Girton (GB); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 249 days.

(21) Appl. No.: 09/849,170

(22) Filed: May 4, 2001

(65) Prior Publication Data

US 2002/0163510 A1    Nov. 7, 2002

(51) Int. Cl.
*G09G 5/00* (2006.01)

(52) U.S. Cl. .................. 345/179; 345/156; 345/180; 345/183; 345/182; 178/178.01; 178/178.03; 178/178.09

(58) Field of Classification Search .......... 345/173, 345/174, 175, 176, 178, 177, 179–183, 156, 345/157, 158; 178/18.01–20.01
See application file for complete search history.

(56) References Cited

U.S. PATENT DOCUMENTS

| | | | |
|---|---|---|---|
| 3,577,022 A | | 5/1971 | Hasinger |
| 3,983,535 A | | 9/1976 | Herbst et al. |
| 4,128,829 A | | 12/1978 | Herbst et al. |
| 4,513,437 A | * | 4/1985 | Chainer et al. .............. 382/3 |
| 5,239,292 A | * | 8/1993 | Willan .................. 345/441 |
| 5,247,137 A | * | 9/1993 | Epperson ................. 178/18 |
| 5,434,371 A | * | 7/1995 | Brooks .................. 178/18 |
| 5,959,617 A | * | 9/1999 | Bird et al. .............. 345/182 |
| 6,084,577 A | * | 7/2000 | Sato et al. .............. 345/179 |
| 6,094,197 A | | 7/2000 | Buxton et al. |
| 6,181,329 B1 | * | 1/2001 | Stork et al. .............. 345/179 |
| 6,188,392 B1 | * | 2/2001 | O'Connor et al. ........... 345/179 |
| 6,573,887 B1 | * | 6/2003 | O'Donnell, Jr. ............ 345/179 |
| 6,577,299 B1 | * | 6/2003 | Schiller et al. ............ 345/179 |
| 6,633,282 B1 | * | 10/2003 | Monroe .................. 345/179 |

(Continued)

FOREIGN PATENT DOCUMENTS

JP    06-019614    *    1/1994

(Continued)

OTHER PUBLICATIONS

Wanatabe et al. Japan Pub. No. 07-261906.*

(Continued)

*Primary Examiner*—Richard Hjerpe
*Assistant Examiner*—Jennifer T. Nguyen
(74) *Attorney, Agent, or Firm*—Workman Nydegger

(57) ABSTRACT

A method and system that converts ballistic movement of a pen (e.g., movement of a pen point across a surface) into thickness information for digital ink data. The pen includes at least one accelerometer that is used to generate the ballistic information. A thickness conversion component may be located on a computer that is remote from the pen, and the ballistic information is transmitted to the computer via a hardwired or wireless connection. The accelerometer generates the ballistic information in the form of pulses, the width of which is directly related to the acceleration of the pen movements. The thickness conversion component converts the acceleration information, with or without additional information such as coordinate information, into thickness information for digital ink. This thickness information may be used to generate variably thick lines, which may be useful for a variety of applications, for example, better display and improved recognition.

22 Claims, 7 Drawing Sheets

U.S. PATENT DOCUMENTS

| | | |
|---|---|---|
| 6,681,045 B1 | 1/2004 | Lapstun et al. |
| 6,694,045 B2 | 2/2004 | Chung et al. |

FOREIGN PATENT DOCUMENTS

| | | | |
|---|---|---|---|
| JP | 07261906 | * | 10/1995 |

OTHER PUBLICATIONS

Analog Devices, "Low-Cost +2g Dual-Axis Accelerometer with Duty Cycle Output", pp. 1-12.

Baron, et al., "Acceleration Measurement with an Instrumented Pen for Signature Verification and Handwriting Analysis", *IEEE Transactions on Instrumentation and Measurement*, vol. 38, No. 6, pp. 1132-1138, Dec. 1989.

Ishikawa, et al., "Extraction of Character Information from Acceleration of Handwriting Pen", *IEIC Technical Report, Institute of Electronics, Information and Communication Engineers*, vol. 92, No. 245, pp. 51-58, 1992.

Lew, J.S., "An Improved Regional Correlation Algorithm for Signature Verification Which Permits Small Speed Changes Between Handwriting Segments", *IBM J.Res Develop.*, vol. 27, pp. 180-185, Mar. 1983.

Milner, Ben, "Handwriting Recognition Using Acceleration-Based Motion Detection", The Institution of Electrical Engineers, pp. 1-6, 1999.

Niblock et al, "A Novel Accelerometer for Sensing Pen Tip Motion", $4^{th}$ *European Conference on Smart Structures and Materials*, Issue 6-8, pp. 707-714, Jul. 1998.

Miyagawa, et al., "Character Pattern Reproduction from Handwriting Pen Acceleration ", Transactions of the Institute of Electronics, Information and Communication Engineers, vol. J83, D-2, No. 2, pp. 671-679, 2000.

* cited by examiner

METHOD OF GENERATING DIGITAL INK THICKNESS INFORMATION

FIELD OF THE INVENTION

The invention relates generally to digital ink, and more particularly to a method for generating digital ink information.

BACKGROUND OF THE INVENTION

Digital ink technology enables a user to write and draw on the touch-sensitive screen of a handheld PC or other writing tablet with a stylus or other pointing device, providing a convenient means for applications to accept input from a user without using a keyboard. For a user, taking notes or drawing sketches with using digital ink technology is very much like writing or drawing on paper.

Contemporary digital ink technology is capable of extracting a variety of information from a user's handwriting, including vector, timing, coordinates, angle of the stylus, and additional information. The digital ink information may be provided to an application, and may be used for many purposes, such as for handwriting recognition. The digital ink information may also be used for improving the way handwriting is displayed, including providing higher resolution, editing, smoothing, and alteration of individual elements, for example.

Contemporary digital ink technology is not, however, effective in generating line thickness information. Thickness information may be helpful, for example, to provide high-resolution display of calligraphy, or for font generation of some characters, such as Chinese characters. Some writing tablets have attempted to utilize pressure sensors in an effort to obtain line thickness information. However, the dynamic range of the pressure sensors in the writing tablets is limited, especially at the pressures at which people tend to write. Thus, it has been found that the pressure differentiation information provided by the existing pressure sensors is not sufficient to provide line thickness information, especially for fountain pen simulation and font generation of Chinese characters.

SUMMARY OF THE INVENTION

The present invention provides a thickness conversion component that converts movement of a pen (e.g., ballistic movement of a pen point across a surface or tilting of a pen) into thickness information for digital ink data. In accordance with one aspect of the invention, the pen includes at least one accelerometer that is used to generate either ballistic movement or ballistic pen tilting information.

In one implementation of the invention, the thickness conversion component is located on a computer that is remote from the pen. In this implementation, the ballistic movement or tilt information is transmitted to the computer via a hardwired or wireless connection. For example, the accelerometer generates the ballistic movement or tilt information in the form of pulses, the width of each pulse being directly related to the acceleration of the pen movements or the tilt of the pen, respectively. The thickness conversion component converts the acceleration information, with or without additional information such as coordinate information, available pressure information, pen angle information, and vector information, into thickness information for digital ink. This thickness information may be used to generate variably thick lines, which may be useful for a variety of applications, for example, better display and improved recognition.

Other advantages will become apparent from the following detailed description when taken in conjunction with the drawings, in which:

DETAILED DESCRIPTION

Exemplary Operating Environment

Figure 1:
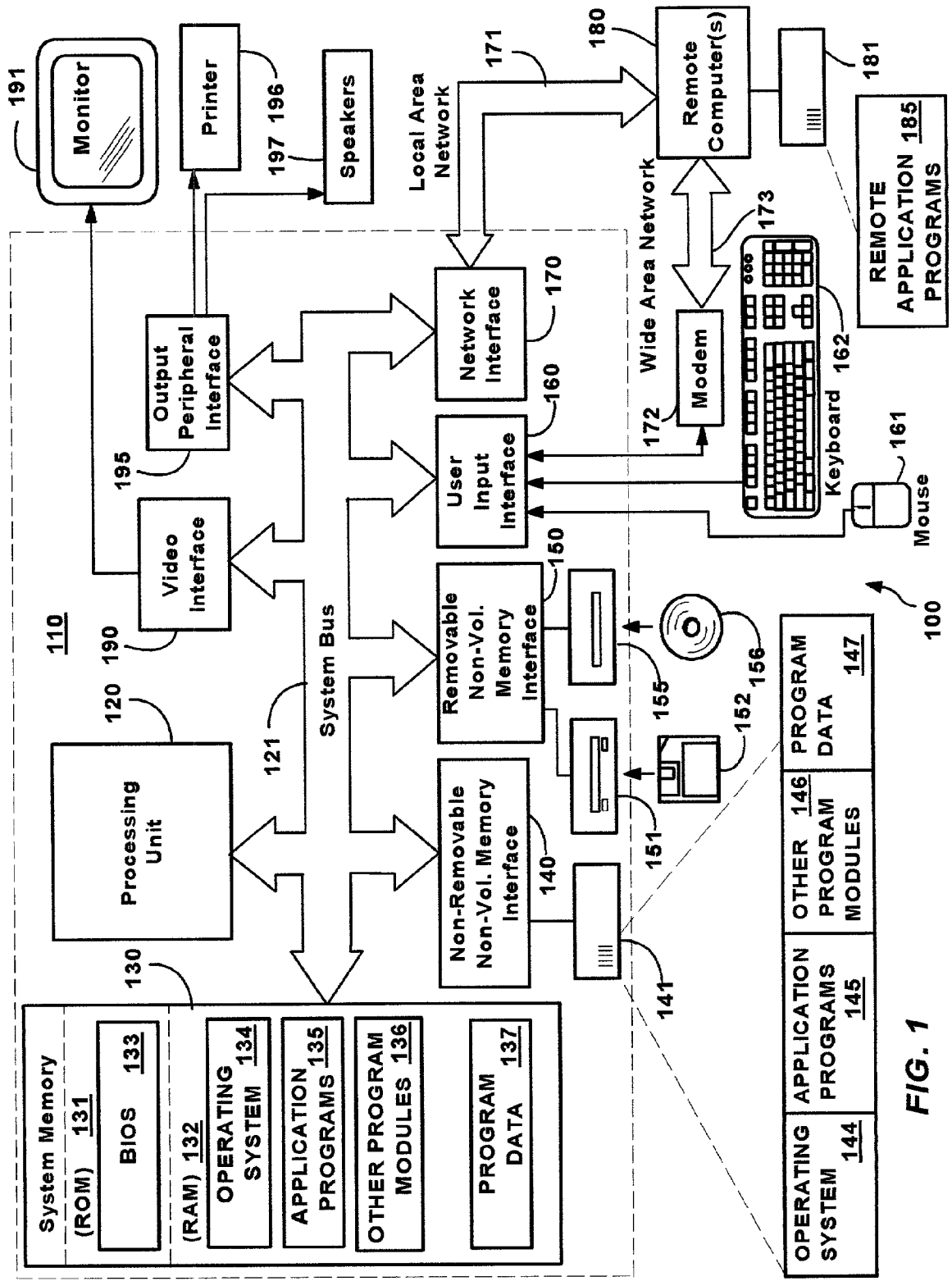
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of an handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Generating Digital Ink Thickness Information

Typically, a user writing on a touch-sensitive screen or tablet generates digital ink information with a stylus or other writing instrument. Generally, digital ink technology stores and/or processes information about stylus, mouse, or other pointer movements, along with enhanced information such as calculated vector information, pressure, timing, strokes, angle of stylus, italic and bold states, and the like. There are a variety of different digital ink formats, and the additional information that the format can store or process with the pointer movements varies for the different applications.

In summary, the present invention is directed to a system and method for generating additional digital ink information in the form of thickness information. The thickness information permits the digital ink information to better match the user's actual writing movements. To this end, a thickness conversion component is provided that converts ballistic pen movement or ballistic pen tilt information generated by movements of a writing instrument (e.g., a pen or a stylus) into thickness information. The thickness information may be used, for example, for enhanced display or recognition purposes. Moreover, the ballistic movement or tilt information may be generated from a writing instrument, such as a pen, independent of a touch-sensitive screen. Thus, a user may generate the ballistic movement or tilt information while writing on paper or another surface, which is beneficial because writing on such surfaces is familiar to most users.

Figure 2:
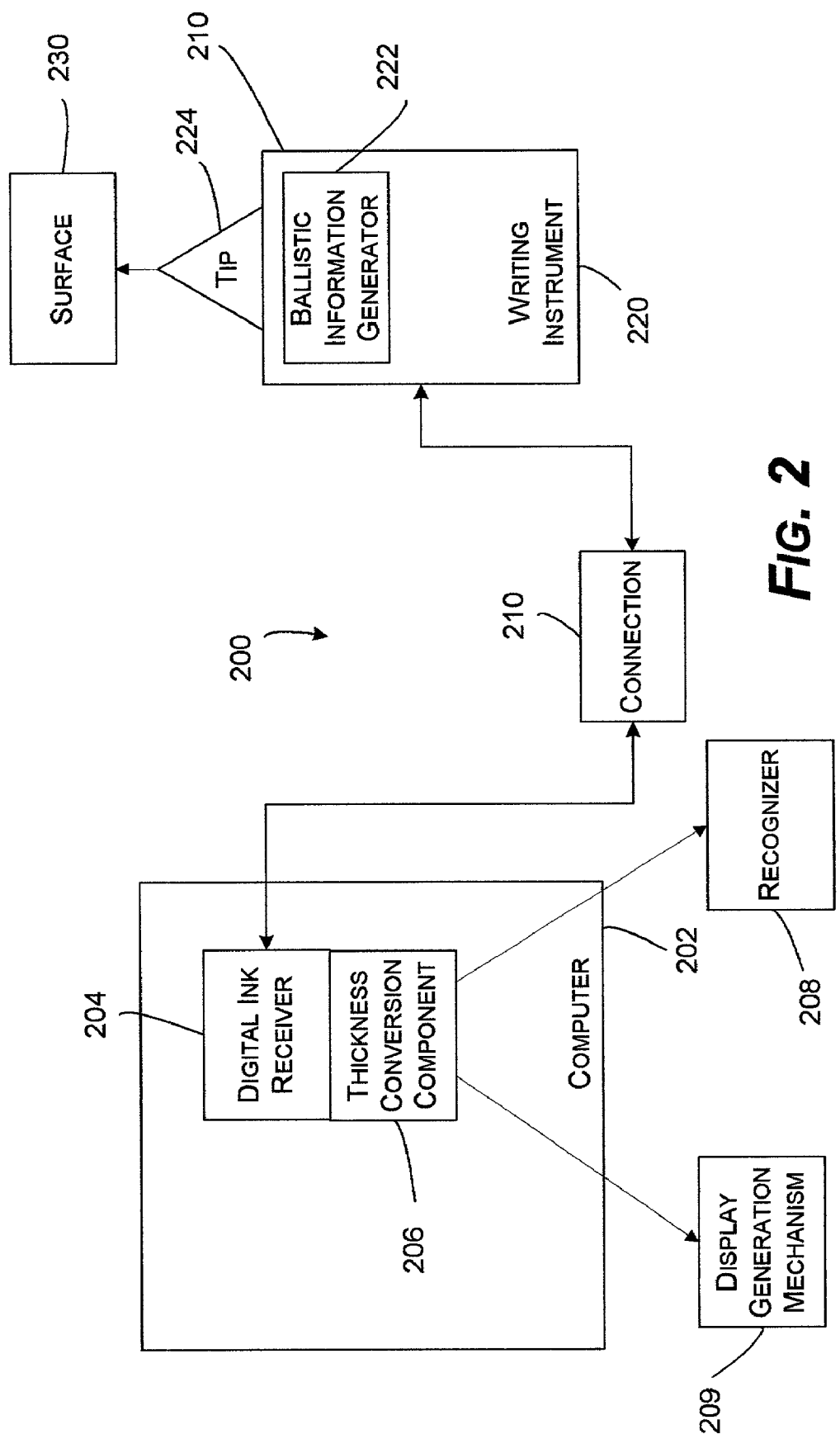
FIG. 2 is a block diagram representing an architecture for a system for generating digital ink thickness information in accordance with one aspect of the invention.

Turning now to the drawings, FIG. 2 shows generally an architecture for a system 200 for generating digital ink thickness information in accordance with one aspect of the invention. The system 200 includes a computer 202 (e.g., the computer 110) having a digital ink receiver 204. The digital ink receiver 204 receives and stores the raw data generated by a user's writing movements, processes that data if necessary, and forwards corresponding appropriate data to the appropriate software, such as the operating system or an application. In this manner, the digital ink receiver enables a user to input information into a computer utilizing a pointer device, and without having to use a keyboard.

In accordance with one aspect of the present invention, the digital ink receiver 204 includes, or alternatively is associated with, a thickness conversion component 206, which is configured to convert ballistic movement or tilt information into thickness information, as is further described below. The digital ink receiver 204 and the thickness conversion component 206 may be provided on a single PC (e.g., the personal computer 202), or the thickness conversion component 206 may be provided on a separate machine from the digital ink receiver 204. In addition, their various functions may be performed by a single device or by several devices.

The thickness conversion component 206 may be connected to a recognizer 208 and/or a display generation mechanism 209, each of which may be integrated with, or separate from, the computer 202. As further described below, one or both of these components, or other software, may utilize the output of the thickness conversion component 206.

The computer 202 is connected via a connection 210 to a writing instrument 220, such as a pen, stylus, pencil, paintbrush, stick, a pointer device, or any other mechanism through which a user may perform writing movements. Information about the writing instrument's movements is transmitted to the computer via the connection 210.

The connection 210 may be hardwired or wireless (wherein if wireless, the connection is conceptual, e.g., line-of-sight for infrared, or within range for FM transmissions, and so forth). As some examples, the computer 202 may be located remotely from the writing instrument 220, and transmission of information regarding movements of the writing instrument 220 to the computer may occur via a wireless transmission, a local area network (e.g., the LAN 171), a wide area network (e.g., the WAN 173), the Internet, or through another network or similar connection. Alternatively, writing information may be stored in memory in the writing instrument, and may be later downloaded to the remote computer. In addition, some or all of the functions of the digital ink receiver 204 and/or the thickness conversion component 206 may be provided in the writing instrument, although in practice, such a design may result in a mechanism that may be too cumbersome for comfortable writing.

The writing instrument 220 includes a ballistic generator 222 that is configured to generate motion information, such as acceleration and/or tilt information, as a result of writing movements. The ballistic generator 222 may be, for example, a dual-axis accelerometer, or a pair of accelerometers, or any other mechanism that is capable of generating data regarding information about movement or tilt of the writing instrument 220.

The writing instrument 220 also preferably includes an appropriate tip 224 for writing on a surface 230 (e.g., paper, a touch-sensitive screen, or a writing tablet). The tip 224 preferably is designed for optimum writing on the surface 230, such as a blunt end for a touch-sensitive screen or tablet, or a pen point or nib for writing on paper.

In practice, a user grips the writing instrument 220 and writes in a standard fashion, either on a writing tablet, or on an ordinary writing surface (e.g., paper). The ballistic generator 222 generates ballistic information regarding the writing instrument's movements or tilt, such as may be caused by a user's writing. If a touch-sensitive screen is utilized, additional digital ink information, such as calculated vector information, pressure, timing, strokes, angle of stylus, and the like, may be generated by the touch-sensitive screen or tablet.

The ballistic information is transferred to the computer 202 via the connection 210 and is received by the digital ink receiver 204. As described below, the thickness conversion component 206 converts the ballistic information, with or without additional information such as coordinate information, available pressure information, pen angle information, and vector information, into thickness information for digital ink. Software (e.g., applications, the operating system, the recognizer 208, or the display generation mechanism 209) that receive the line thickness information may utilize the thickness information, for example, to generate variably thick lines, which may be useful for a variety of purposes, for example, improved display of calligraphy and/or Chinese characters (e.g., via the display generation mechanism 209), and/or better recognition accuracy (e.g., via the recognizer 208).

Figure 3:
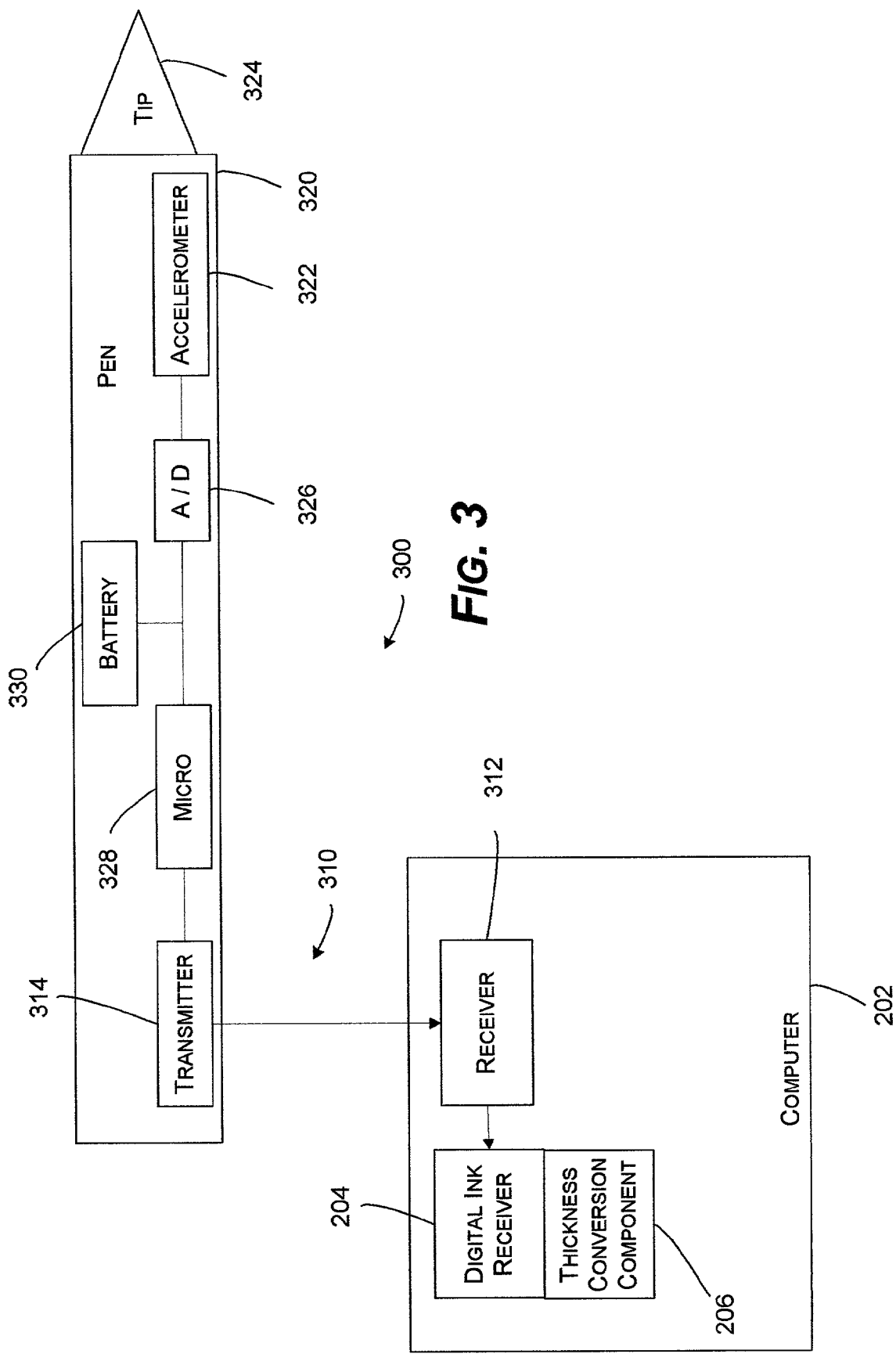
FIG. 3 is a block diagram representing an architecture of one system for generating digital ink thickness information in accordance with an aspect of the invention.

FIG. 3 shows a representation of an embodiment of a digital ink generation system 300 that incorporates the present invention and that utilizes a wireless connection 310. The wireless connection 310 includes a receiver 312 at the computer 202, and a transmitter 314 at the pen 220. The writing instrument in the example shown in FIG. 3 is a pen 320.

The ballistic generator in the embodiment of FIG. 3 is an accelerometer 322, which is mounted adjacent to the tip 324 of the pen 220. It has been found that mounting the accelerometer 322 in this location permits the accelerometer to more accurately reflect the pen tip's trajectory, however other locations may work better with other types of components.

The accelerometer 322 is wired to an analog-to-digital (A/D) converter 326, which in turn is connected to a microcontroller 328. Alternatively, a digital output accelerometer may be used, whereby the A/D converter 326 is not needed. The microcontroller 328 is wired to the transmitter 314. A battery 330 is attached to the microcontroller 320 to provide power to the circuit.

For the embodiment shown in FIG. 3, a user grasps the pen 320 and writes on a surface such as paper or a writing tablet. The accelerometer 322 generates analog ballistic information, in the form of pulses, and forwards that information to the A/D converter 322, where the analog ballistic information is converted to digital ballistic signals. Alternatively, the accelerometer 322 may output digital signals, whereby the A/D converter 322 is not needed. The microcontroller 320 controls the transfer of data from the pen 220 to the computer 202. In the embodiment shown in FIG. 3, the transmitter 314 sends the digital ballistic signals to the receiver 312. The digital ballistic signals are converted by the thickness conversion component 206 into thickness information, as is further described below.

It can be understood that some the components of the pen may be distributed between the computer 202 and the pen 320. For example, analog ballistic information may be transmitted to the computer, and the analog-to-digital converter 326 may be located at the computer.

Figure 4:
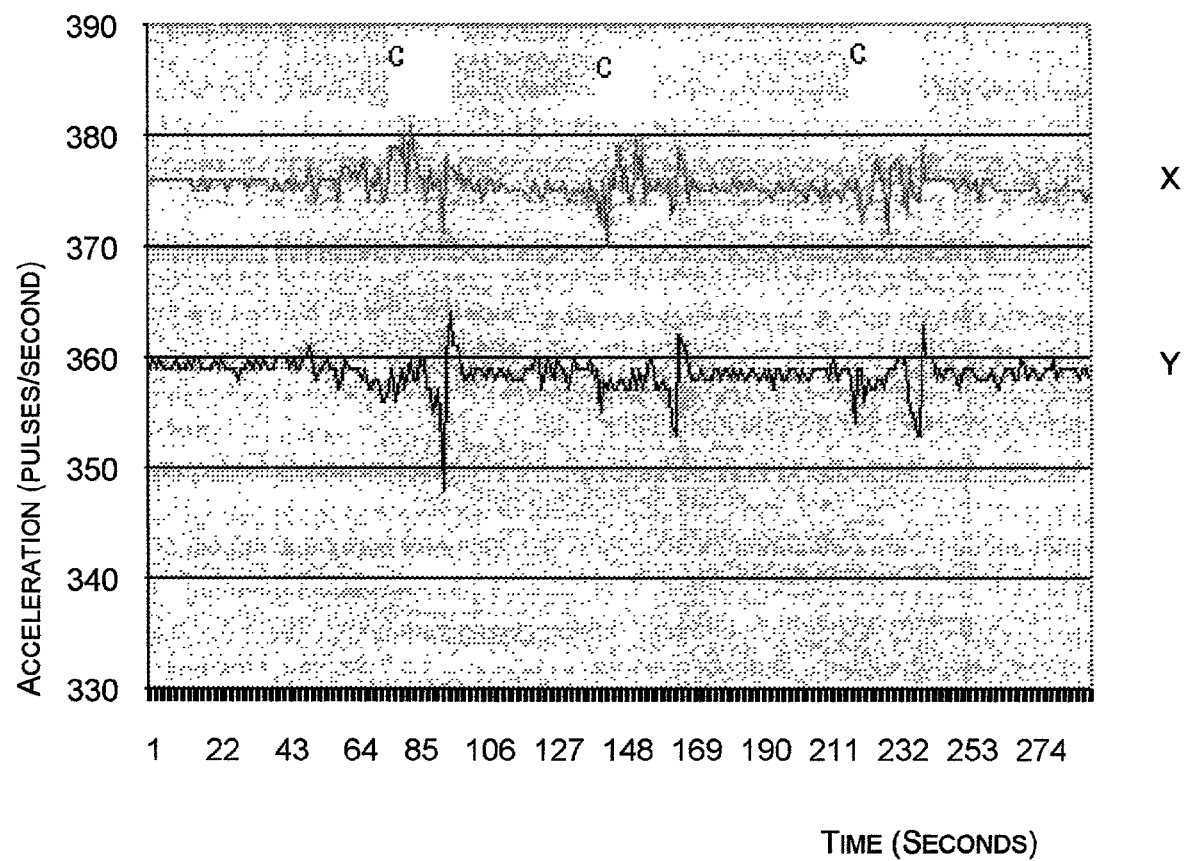
FIG. 4 is a representation of a graph of acceleration versus time generated by the system of the present invention for an exemplary amount of handwritten data over time.

FIG. 4 is a representation of a graph of data generated by an accelerometer (e.g., the accelerometer 322) as a result of movements of a writing instrument (e.g., the writing instrument 220). The graph maps acceleration, as wavelength of pulses generated by the accelerometer, versus time for both X and Y movements of the pen 220.

The relative acceleration and deceleration of the pen in the X and Y axes that is measured by the ballistic generator 222 may be used to provide dynamic information regarding the motion of the pen and hence form a two-dimensional vector stream representing the pen movement. Other pen movement information may be extracted from, for example, a handwriting tablet, or sensors placed in the writing instrument 220. The additional pen movement information may also be used to extract vector information for handwriting recognition.

Applicants have also found that thickness information can be determined from the relative acceleration and deceleration of the pen 220 in the X and Y-axes. In essence, pulses generated by the accelerometer have a larger wavelength as a result of slowing down of movement of the pen in the particular dimension. The slower movements by the pen generate the larger the wavelength of the pulses, which generally represent positions where a user's handwriting pattern would be thicker. Thus, there is a direct correlation between the wavelength and pen thickness information. Other pen movement information may be used to enhance the ballistic information that is extracted by the ballistic generator 222, e.g., by adding thickness information such as in the form of pressure information.

Using the thickness information extracted by the ballistic generator (and pressure information, if available), the thickness conversion component 206 can provide instructions or other information to software or the display generation mechanism 209 that instructs the software or display generation mechanism to amplify the digital ink (e.g., by adding additional bits to a bitmap, or by increasing the thickness of lines in an application) in places where pulse widths are read to be larger, or alternatively may thin lines where pulses are read to be smaller. In this manner, thickness information may be produced from accelerometer pulse information.

Figure 5:
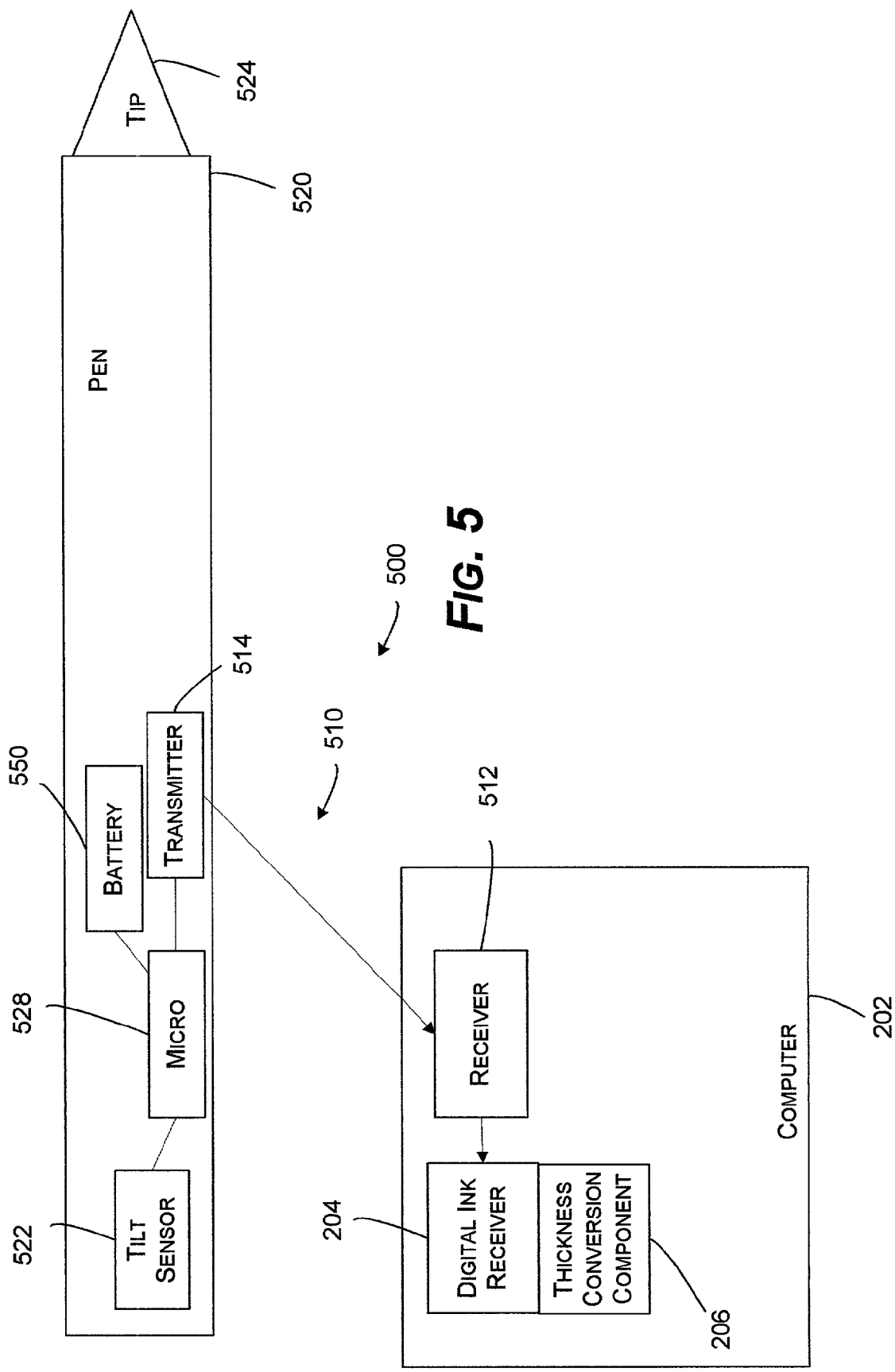
FIG. 5 is a block diagram representing an architecture of a second system for generating digital ink thickness information in accordance with another aspect of the invention.

In another embodiment shown in FIG. 5, the ballistic generator 522 is a dual-axis accelerometer that is arranged to produce tilt data (i.e., the accelerometer is arranged to be used as a tilt sensor). When used as a tilt sensor, an accelerometer uses the force of gravity as an input vector to determine the orientation of an object. An accelerometer is most sensitive to tilt when its sensitive axis is perpendicular to the force of gravity, i.e., parallel to the earth's surface. At this orientation its sensitivity to changes in tilt is highest. Thus, for the dual-axis accelerometer to be used as a tilt sensor, it is preferred that the X and Y axes for the accelerometer be aligned perpendicular to the axis of the writing instrument 220, and parallel with the ground when the pen is in an upright position. An example of a dual-axis accelerometer that works well for this purpose is the +/−2 g Dual-Axis Accelerometer with Duty Cycle Output produced by Analog Devices, Inc. of Norwood Mass. under the model number ADXL202E.

For the tilt sensor embodiment, mounting the tilt sensor adjacent to the top end of the writing instrument 220 may produce the most accurate information, but the tilt sensor may be mounted in other locations as desired. The remaining components of the tilt sensor are essentially the same as the previous embodiment (i.e., the microcontroller 528, the transmitter 514, and battery 550). The ADXL202E accelerometer produces digital output, so an analog-to-digital converter is not needed.

The dual-axis digital accelerometer (e.g., the ADXL202e accelerometer) generates ballistic angle movement information regarding the writing instrument 220. Pen position data is generated, for example, at 60 samples/sec/channel. The x and y channel data is read into the microcontroller 528 and is combined into a single channel of ASCII data for transmission by the transmitter 314, e.g., at 1200 Baud. The transmitter 314 may be, for example, a 433 MHz, AM transmitter having a range up to 100 meters. The transmission may or may not be encrypted.

The raw data from the accelerometer is received by the digital ink receiver 504, and is converted to pitch and roll angles in a manner known in the art (see, for example, the product literature for the ADXL202E, incorporated herein by reference). The pitch and roll angles may then be used to plot relative X and Y components, which represent the pen movements that are generated by a user.

Figure 6:
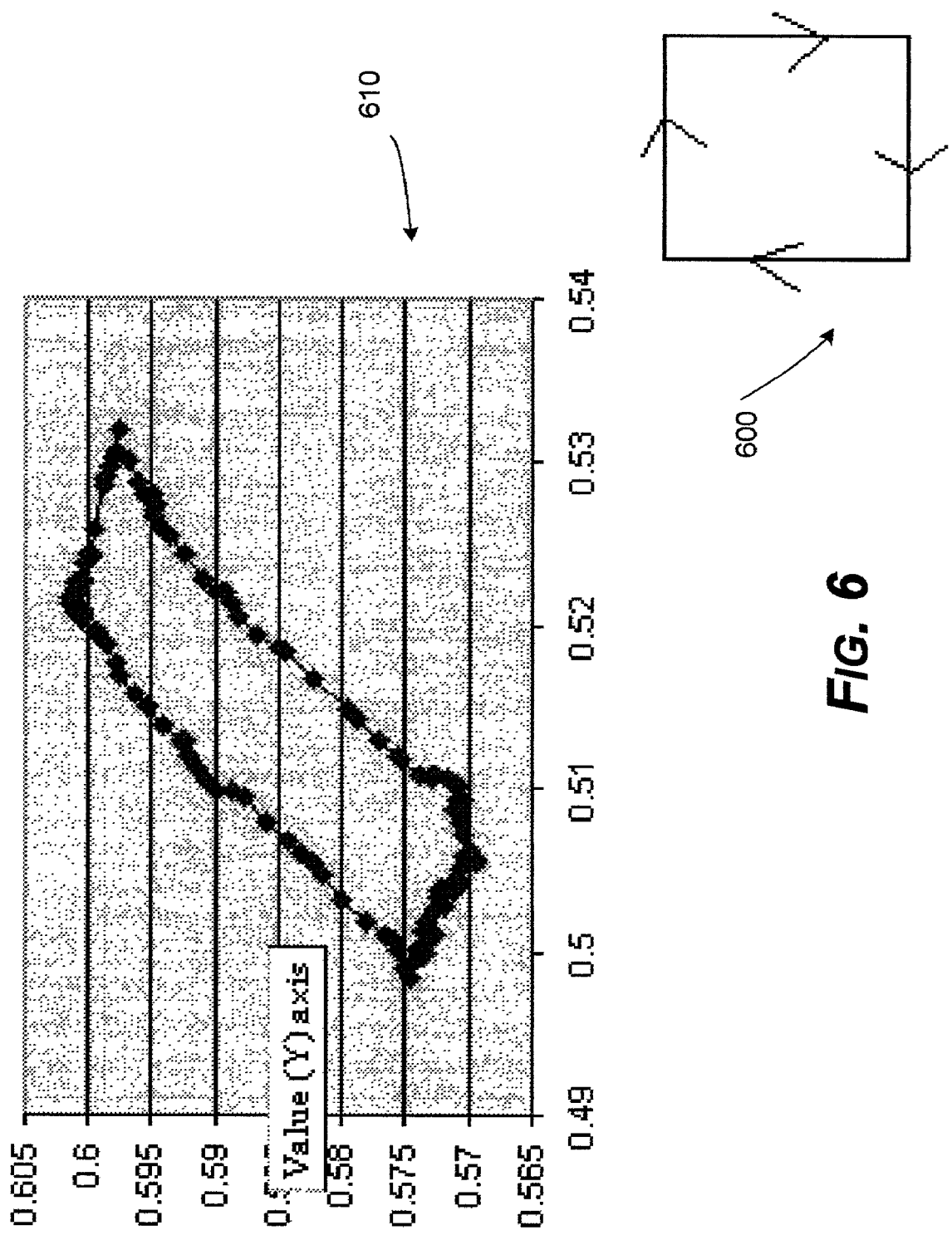
FIG. 6 is a graph representation of data produced by the system of FIG. 5.

As an example, FIG. 6 shows a representation of a parallelogram 600 that may be drawn by a user with the pen 520. The computer 202 generates a graph 610 that represents a plot of the X and Y positions of the data generated by the tilt sensor 520. Although the sides do not align vertically and horizontally in the graph plot shown in FIG. 6, rotating the pen 520 in the user's hand may generate another set of data points that align with the vertical and horizontal axes in the graph. In any event, alignment of the data plots is not critical, because the data points may be properly interpreted because they are read relative to one another, and not to the orientation of the graph 610.

Applicants have found that the data plots in the graph 610 may be utilized to generate thickness information. As the user draws faster (and thus with less pressure and less thickness), there are less samples/unit distance (see sides of parallelogram). As the user draws more slowly (and thus with greater pressure and more thickness), there are more samples/unit distance (see corners). Using this information, thickness information may be generated by directly correlating the proximity of adjacent plots to thickness information. That is, closely packed plots are generated around thicker lines, and separated plots are generated on thin lines.

Using this information, the thickness conversion component 206 can provide instructions or other information to software or the display generation mechanism 209 that instructs the software or display generation mechanism to amplify the digital ink (e.g., by adding additional bits to a bitmap, or by increasing the thickness of lines in an application) in places where pulse widths are read to be larger, or alternatively may thin lines where pulses are read to be smaller. In this manner, digital ink thickness information may be generated from a tilt sensor.

Figure 7:
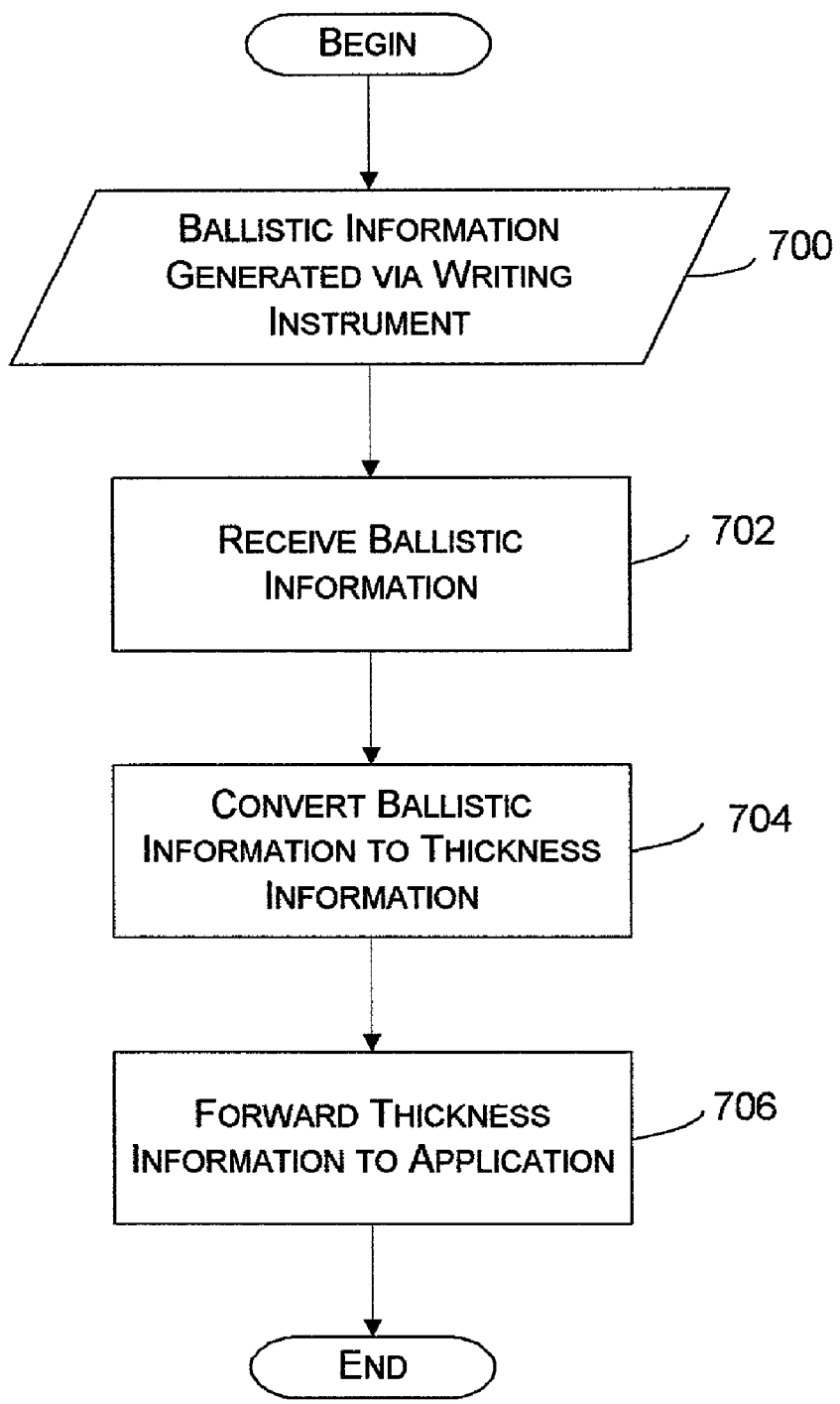
FIG. 7 shows a general overview of a process for generating line thickness information from a writing input of a user in accordance with one aspect of the present invention.

Turning now to an explanation of the operation of the present invention, FIG. 7 shows a general overview of a process for generating line thickness information from a writing input of a user in accordance with one aspect of the present invention. Beginning at step 700, a user utilizes a writing instrument (e.g., the pen 320) to generate ballistic information. As discussed above, the ballistic information may be generated by the accelerometer 322 or by the tilt sensor 522 as a result of writing movements by the pen 320 or the pen 520.

At step 702, the ballistic information is received by the computer 202 (e.g., through the connection 310). The thickness conversion component then converts the ballistic information to line thickness information (step 704). As discussed above, this conversion may be, for example, based upon pulse wavelength thickness for the use of an accelerometer, or proximity of plots if a tilt sensor is used. The line thickness information is forwarded to the appropriate application (step 706). The application may be, for example, recognition or display software.

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computer system, comprising,
a writing instrument configured to detect, relative to itself and using an accelerometer, pulses representing ballistic information about the writing instrument the represented ballistic information including represented acceleration information from a user's handwriting; and
a conversion component configured to receive the pulses representing ballistic information, including the represented acceleration information from the user's handwriting, directly from the writing instrument and to convert the received pulses representing the acceleration information to generate line thickness information for a digital representation of a portion of the user's handwriting that is to be displayed on a display device.

2. The computer system of claim 1, wherein the writing instrument is a pen.

3. The computer system of claim 1, wherein the accelerometer generates analog movement information, and wherein the writing instrument comprises an analog-to-digital converter for converting the analog movement information to digital data.

4. The computer system of claim 3, wherein the conversion component is located remote from the writing instrument, and further comprising transmitting the digital data to the conversion component.

5. The computer system of claim 4, wherein the digital data is transmitted via a wireless connection.

6. The computer system of claim 4, wherein the digital data is transmitted via a hardwired connection.

7. The computer system of claim 1, wherein the accelerometer is configured to generate tilt information.

8. The computer system of claim 1, wherein the conversion component generates thickness information based upon wavelengths of the movement information.

9. The computer system of claim 8, wherein the thickness information increases a thickness component as the wavelengths increase.

10. The computer system of claim 1, wherein the conversion component is located remote from the writing instrument, and further comprising transmitting the digital data to the conversion component.

11. The computer system of claim 10, wherein the digital data is transmitted via a wireless connection.

12. The computer system of claim 10, wherein the digital data is transmitted via a hardwired connection.

13. The computer system of claim 1, wherein the movement information comprises pulses having wavelengths.

14. The computer system of claim 13, wherein the thickness information increases a thickness component as the wavelengths increase.

15. A computer system, comprising,
a writing instrument configured to detect, relative to itself and using an accelerometer, pulses representing movement information about the writing instrument including represented acceleration information from a user's handwriting; and
a conversion component configured to receive the pulses representing movement information, including the represented acceleration information from the user's handwriting, directly from the writing instrument and to convert the received pulses representing the acceleration information to generate line thickness information for a digital representation of portion of the user's handwriting that is to be displayed on a display device based upon spacing of plots in a map of a plot of the movement information.

16. The computer system of claim 15, wherein the thickness information is based upon the samples/unit distance of the plots.

17. The computer system of claim 16, wherein the thickness information increases a thickness component as the samples/unit distance increase.

18. The computer system of claim 15, wherein the movement information comprises tilt information.

19. A computer system, comprising,
a writing instrument configured to detect, relative to itself, pulses representing movement information including represented acceleration and represented tilt information about the writing instrument from a user's handwriting; and
a conversion component configured to receive the pulses representing movement information, including the represented acceleration and tilt information from the user's handwriting, directly from the writing instrument and to convert the represented acceleration information to generate line thickness information for a digital representation of portion of the user's handwriting that is to be displayed on a display device based upon spacing of plots in a map of a plot of the tilt information.

20. The computer system of claim 19, wherein the thickness information is based upon the samples/unit distance of the plots.

21. The computer system of claim 20, wherein the thickness information increases a thickness component as the samples/unit distance increase.

22. The computer system of claim 19, wherein the writing instrument is configured to detect pulses from an accelerometer representing tilt information about the writing instrument.

* * * * *